United States Patent
Kim et al.

(10) Patent No.: US 8,274,187 B2
(45) Date of Patent: Sep. 25, 2012

(54) ROTOR AND VIBRATION MOTOR

(75) Inventors: Do Hyun Kim, Ansan-si (KR); Jun Hee Ryu, Gumi-si (KR); Byung Hee Mun, Ansan-si (KR); Young Il Park, Gunpo-si (KR)

(73) Assignee: LG Innotek Co., Ltd., Seoul (KR)

( * ) Notice: Subject to any disclaimer, the term of this patent is extended or adjusted under 35 U.S.C. 154(b) by 27 days.

(21) Appl. No.: 12/742,338

(22) PCT Filed: Nov. 10, 2008

(86) PCT No.: PCT/KR2008/006625
§ 371 (c)(1),
(2), (4) Date: May 11, 2010

(87) PCT Pub. No.: WO2009/064095
PCT Pub. Date: May 22, 2009

(65) Prior Publication Data
US 2010/0264766 A1  Oct. 21, 2010

(30) Foreign Application Priority Data
Nov. 12, 2007  (KR) .................. 10-2007-0114826

(51) Int. Cl.
*H02K 7/60* (2006.01)
(52) U.S. Cl. ............... 310/81; 310/90; 310/51; 384/296
(58) Field of Classification Search ............ 310/81, 310/90, 51; 384/275, 296
See application file for complete search history.

(56) References Cited

U.S. PATENT DOCUMENTS

| | | | |
|---|---|---|---|
| 6,541,891 B2* | 4/2003 | Yamaguchi | 310/268 |
| 6,853,109 B2* | 2/2005 | Koyanagi et al. | 310/233 |
| 6,922,309 B2* | 7/2005 | Kayama et al. | 360/99.08 |
| 2002/0047464 A1 | 4/2002 | Yamaguchi | |
| 2002/0074877 A1* | 6/2002 | Lee et al. | 310/81 |
| 2003/0178902 A1 | 9/2003 | An et al. | |
| 2003/0193262 A1 | 10/2003 | Koyanagi et al. | |
| 2004/0000825 A1 | 1/2004 | Hirose et al. | |

FOREIGN PATENT DOCUMENTS

| | | |
|---|---|---|
| CN | 1329385 A | 1/2002 |
| CN | 1360389 A | 7/2002 |
| CN | 1453909 A | 11/2003 |
| JP | 06-311693 A | 11/1994 |
| JP | 09-131020 A | 5/1997 |

(Continued)

OTHER PUBLICATIONS

First Office Action dated Apr. 11, 2012 in Chinese Application No. 200880123637.2, filed Nov. 10, 2008.

(Continued)

*Primary Examiner* — Quyen Leung
*Assistant Examiner* — Leda Pham
(74) *Attorney, Agent, or Firm* — Saliwanchik, Lloyd & Eisenschenk

(57) ABSTRACT

A rotor is provided. The rotor includes a bearing yoke, a supporting member, a rotor substrate, a coil, and a weight coupled to the supporting member. The supporting member is coupled to the bearing yoke. The rotor substrate is supported by the supporting member. The coil is supported by the supporting member and electrically connected to the rotor substrate. The weight is coupled to the supporting member.

15 Claims, 1 Drawing Sheet

FOREIGN PATENT DOCUMENTS

| | | |
|---|---|---|
| JP | 2001-178100 A | 6/2001 |
| JP | 2003-285009 A | 10/2003 |
| JP | 2004-080979 A | 3/2004 |
| JP | 2006-101601 A | 4/2006 |
| JP | 2006-341207 A | 12/2006 |
| KR | 10-1999-0050520 A | 7/1999 |
| KR | 10-2007-0046307 A | 5/2007 |

OTHER PUBLICATIONS

Office Action dated Jun. 12, 2012 in Japanese Application No. 2010-533013, filed Nov. 10, 2008.

* cited by examiner

[Fig. 1]
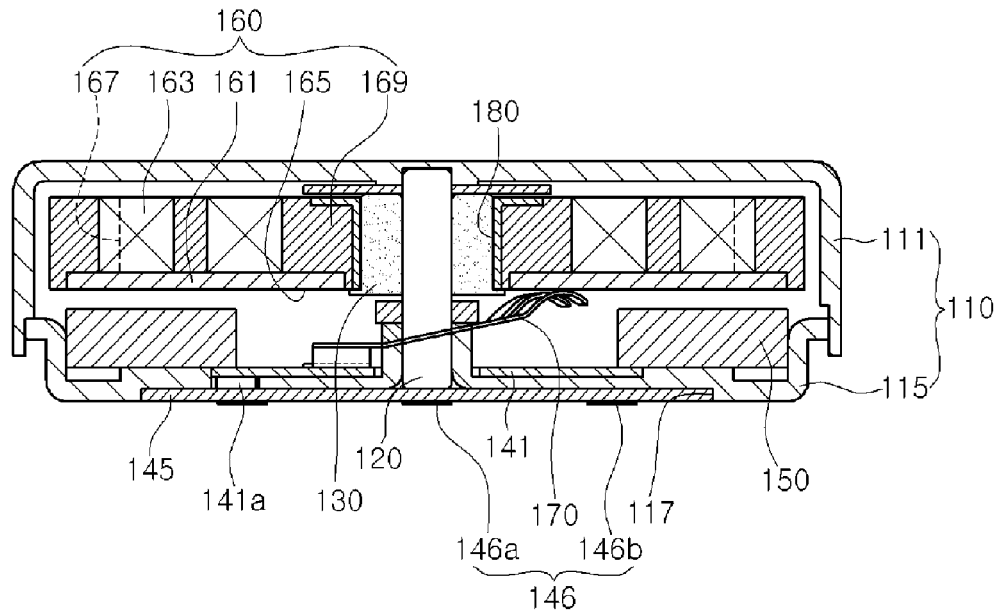
[Fig. 2]
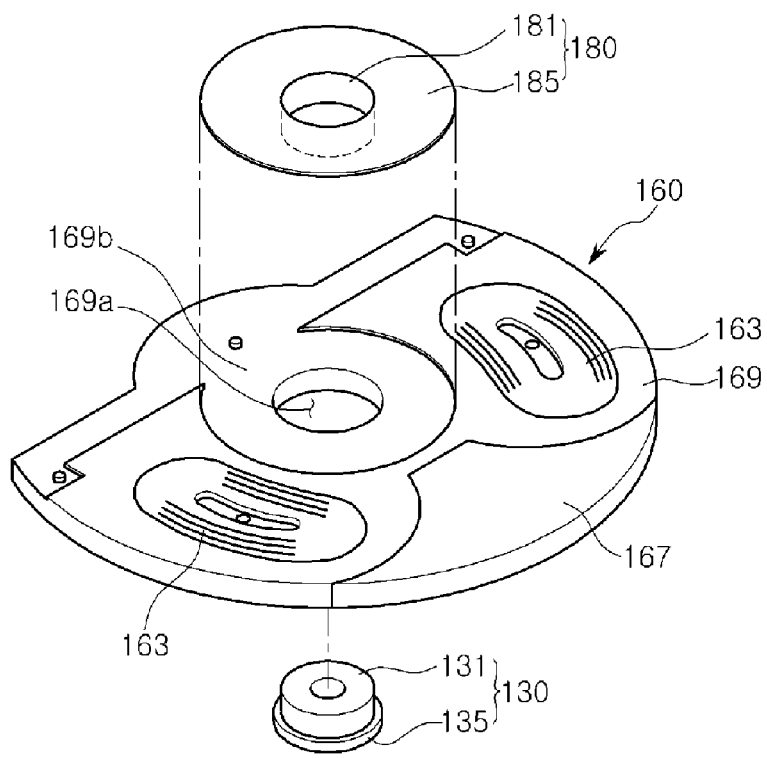

ROTOR AND VIBRATION MOTOR

CROSS-REFERENCE TO RELATED APPLICATIONS

This application is the U.S. national stage application of International Patent Application No. PCT/KR2008/006625, filed Nov. 10, 2008, which claims priority to Korean Application No. 10-2007-0114826, filed Nov. 12, 2007, the disclosures of each of which are incorporated herein by reference in their entirety.

TECHNICAL FIELD

The present disclosure relates to a rotor and a vibration motor.

BACKGROUND ART

In a vibration motor, a shaft is disposed between mutually coupled upper and lower cases, an eccentric rotor is rotatably installed at the shaft, and a stator is installed at the lower case.

While being rotated by reaction with the stator, the eccentric rotor generates vibration.

DISCLOSURE OF INVENTION

Technical Problem

Embodiments provide a rotor and a vibration motor that have innovative structures.

Embodiments also provide a rotor that can be firmly coupled to a bearing, and a vibration motor including the rotor.

Technical Solution

In one embodiment, a rotor includes: a bearing yoke; a supporting member coupled to the bearing yoke; a rotor substrate supported by the supporting member; a coil supported by the supporting member and electrically connected to the rotor substrate; and a weight coupled to the supporting member.

In another embodiment, a rotor includes: a rotor substrate including a first hole at one side; a plurality of coils disposed at a surface of the rotor substrate and electrically connected to the rotor substrate; a weight supported on the surface of the rotor at a position not interfering with the coils for making the rotor eccentric; a supporting member configured to fix the coils and the weight and including a second hole coaxial with the first hole; a bearing yoke including a coupling tube fixed to the second hole and a stopper rim, the stopper rim extending outward from an end portion of the coupling tube in a radial direction for making contact with the supporting member; and a commutator disposed on the other surface of the rotor substrate around the first hole.

In further another embodiment, a vibration motor includes: a shaft; a rotor rotatably coupled to the shaft; and a stator facing the rotor, wherein the rotor includes: a bearing coupled to the shaft; a bearing yoke conductive wires the bearing; a supporting member coupled to the bearing yoke; a rotor substrate supported by the supporting member; a coil supported by the supporting member and electrically connected to the rotor substrate; and a weight coupled to the supporting member.

In still further another embodiment, a vibration motor includes: a case including an upper case and a lower case; a shaft supported by the case; a rotor rotatably coupled to the shaft; a stator facing the rotor and disposed at the lower case; a first substrate disposed at an upper surface of the lower case; a second substrate disposed at a lower surface of the lower case; and a connection terminal disposed through the lower case for electrically connecting the first and second substrates, wherein the rotor includes: a bearing coupled to the shaft; a bearing yoke conductive wires the bearing; a supporting member coupled to the bearing yoke; a rotor substrate supported by the supporting member; a coil supported by the supporting member and electrically connected to the rotor substrate; and a weight coupled to the supporting member.

Advantageous Effects

Embodiments provide a rotor and a vibration motor that have innovative structures.

Embodiments also provide a rotor that can be firmly coupled to a bearing, and a vibration motor including the rotor.

BRIEF DESCRIPTION OF DRAWINGS

FIG. 1 is a cross-sectional view illustrating a vibration motor according to an embodiment.

FIG. 2 is a view illustrating a rotor according to an embodiment.

MODE FOR THE INVENTION

A rotor and a vibration motor will now be described in detail with reference to the accompanying drawings, in which exemplary embodiments are illustrated.

FIG. 1 is a cross-sectional view illustrating a vibration motor according to an embodiment, and FIG. 2 is a view illustrating a rotor according to an embodiment.

Referring to FIGS. 1 and 2, a case 110 includes an upper case 111 and a lower case 115. The case 110 provides a space in which a rotor 160 and a stator 150 are disposed. The upper case 111 is coupled to the lower case 115 from the upper side of the lower case 115.

The upper case 111 and the lower case 115 may be formed of the same material or different materials. For example, the upper case 111 may be formed of a metal, and the lower case 115 may be composed of a printed circuit board. In the current embodiment, both the upper case 111 and the lower case 115 are formed of a metal.

A shaft 120 disposed inside the case 110, and a bearing 130 is fitted to the shaft 120. One side of the shaft 120 is supported by the upper case 111, and the other side of the shaft 120 is supported by the lower case 115. For example, the shaft 120 may be fixed to the upper case 111 and/or the lower case 115 by welding or press fitting.

A washer may be disposed between the bearing 130 and the upper case 111, or between the bearing 130 and the lower case 115.

A first substrate 141 is fixed to a top center portion of the lower case 115. The first substrate 141 surrounds the shaft 120. A second substrate 145 is coupled to the bottom side of the lower case 115. The second substrate 145 is electrically connected to the first substrate 141.

A connection terminal 141a is disposed at the first substrate 141. The connection terminal 141a is electrically connected to the second substrate 145. The connection terminal 141a is electrically connected to the second substrate 145 through a penetration hole formed through the lower case 115.

An accommodation recess 117 is formed in the bottom side of the lower case 115 so that the second substrate 145 can be inserted in the accommodation recess 117. Since the second substrate 145 is disposed in the accommodation recess 117, the thickness of the vibration motor can be reduced by the thickness of the second substrate 145. That is, the vibration motor of the current embodiment can have a slim shape.

The vibration motor may be mounted on a substrate of a product by fixing the peripheral bottom side of the accommodation recess 117 to the substrate of the product by soldering.

Power terminals 146 are disposed at the bottom side of the second substrate 145 such that the vibration motor can be electrically connected to a substrate of a product through the terminals 146. A terminal (not shown) is disposed at the top side of the second substrate 145 and electrically connected to the connection terminal 141a.

The power terminals 146 include a circular inner terminal 146a and a ring-shaped outer terminal 146b disposed around the inner terminal 146a. A circuit pattern corresponding to the power terminals 146 may be formed on a substrate of a product on which the vibration motor will be mounted.

Therefore, when the vibration motor is mounted on a substrate of a product, electric connection to the substrate may be easily made because the vibration motor can be oriented in any directions.

The stator 150 has a ring shape and disposed on the top side of the lower case 115 around the shaft 120. The stator 150 may be composed of magnet(s).

In the vibration motor of the current embodiment, the second substrate 145 is coupled to the bottom side of the lower case 115 and exposed to the outside of the vibration motor, so that the power terminals 146 of the second substrate 145 can be electrically connected to a substrate of a product with ease through an automatic reflow process.

Furthermore, since the bottom side of the vibration motor can be coupled to a substrate of a product through a reflow process, the vibration motor can be easily installed.

The bearing 130 may be formed of a metal. The rotor 160 is coupled to the bearing 130 and is rotated by reaction with the stator 150. While the rotor 160 rotates, the rotor generates vibration due its eccentricity.

The rotor 160 includes a rotor substrate 161, a coil 163, a weight 167, and a supporting member 169.

The rotor substrate 161 includes a commutator 165 disposed on its bottom side, and the coil 163 is disposed on the top side of the rotor substrate 161 and electrically connected to the rotor substrate 161.

The rotor substrate 161 has a semicircular shape enclosing the bearing 130, and a penetration hole is formed in a center portion of the rotor substrate 161.

A brush 170 is installed at the first substrate 141. The brush 170 is electrically connected to the commutator 165 to supply power to the coil 163.

Power supplied from a substrate of a product is transmitted to the coil 163 through the second substrate 145, the connection terminal 141a, the first substrate 141, the brush 170, and the rotor substrate 161 including the commutator 165.

When power is supplied to the coil 163, the rotor 160 and the stator 150 react with each other, and thus the rotor 160 is rotated.

The weight 167 is formed of a metal and is disposed on the top surface of the rotor substrate 161. The supporting member 169, the rotor substrate 161, the coil 163, and the weight 167 are integrally coupled to each other.

For example, after placing the coil 163 and the weight 167 on the rotor substrate 161, the rotor substrate 161 may be inserted into a mold, and a synthetic resin may be injected into the mold to form the supporting member 169. In this way, the rotor substrate 161, the coil 163, and the weight 167 can be integrally coupled by the supporting member 169. At this time, a coupling hole 169a is formed in a center portion of the supporting member 169.

If the bearing 130 is directly coupled to the coupling hole 169a of the supporting member 169, the coupling strength between the bearing 130 and the rotor 160 may be low because the coupling is made between a synthetic resin material and a metal.

Therefore, in the current embodiment, a metal bearing yoke 180 is coupled to the rotor 160, and then the bearing 130 is coupled to the rotor 160 through the bearing yoke 180.

In detail, the bearing yoke 180 includes a coupling tube 181 and a stopper rim 185 extending outward from an upper end portion of the coupling tube 181. When assembled, the stopper rim 185 is disposed at the top side of the rotor 160. That is, the coupling tube 181 is coupled to the coupling hole 169a, and the stopper rim 185 is coupled to a stopper part 169b formed at the top side of the rotor 160 in a recess shape.

The bearing 130 includes a tube-shaped body 131 and a flange 135 extending outward from a lower end portion of the body 131. The body 131 is coupled to the coupling tube 181 by press fitting, and the flange 135 is brought contact with the bottom side of the rotor 160.

That is, since the metallic bearing 130 is press-fitted to the metallic bearing yoke 180, the bearing 130 and the bearing yoke 180 can be securely coupled, and thus the bearing 130 and the bearing yoke 180 can be rotated together without being separated.

The stopper rim 185 of the bearing yoke 180 makes contact with the top side of the rotor 160, and the flange 135 of the bearing 130 makes contact with the bottom side of the rotor 160. Therefore, the bearing yoke 180 and bearing 130 that are coupled to each other are not separated from the rotor 160 even when an impact is applied to the rotor 160.

The coupling tube 181 of the bearing yoke 180 may be coupled to the rotor 160 by press fitting. Alternatively, the coupling tube 181 of the bearing yoke 180 may be integrally coupled to the supporting member 169 when the supporting member 169 is formed by injection molding. For much stronger coupling, the bearing yoke 180 and the bearing 130 may be coupled to each other by laser welding.

As described above, the stopper part 169b is formed at the top side of the rotor 160 around the coupling hole 169a for receiving the stopper rim 185 of the bearing yoke 180. Therefore, the stopper rim 185 of the bearing yoke 180 placed in the stopper part 169b of the rotor 160 does not protrude upward. Thus, the thickness of the vibration motor can be reduced by the thickness of the stopper rim 185.

Although embodiments have been described with reference to a number of illustrative embodiments thereof, it should be understood that numerous other modifications and embodiments can be devised by those skilled in the art that will fall within the spirit and scope of the principles of this disclosure.

INDUSTRIAL APPLICABILITY

The rotor and the vibration motor of the embodiments can be used in various electronic devices requiring vibration.

The invention claimed is:
1. A rotor comprising:
a bearing yoke;
a supporting member coupled to the bearing yoke;
a rotor substrate supported by the supporting member;

a coil supported by the supporting member and electrically connected to the rotor substrate; and a weight coupled to the supporting member;

wherein the bearing yoke comprises:

a coupling tube; and a stopper rim extending outward from an upper end portion of the coupling tube in a radial direction, wherein at least a portion of the stopper rim is overlapped with the rotor substrate in a vertical direction.

2. The rotor according to claim 1, wherein the rotor substrate is disposed at a lower side of the supporting member, and the coil is disposed at an upper side of the rotor substrate.

3. The rotor according to claim 1, wherein the bearing yoke is formed of a metal.

4. The rotor according to claim 1, wherein the supporting member comprises a recess-shaped stopper part disposed at an upper surface of the supporting member for receiving the stopper rim.

5. The rotor according to claim 1, further comprising a bearing coupled to the coupling tube.

6. The rotor according to claim 5, wherein the bearing comprises:

a body; and a flange extending outward from a lower end portion of the body in a radial direction.

7. The rotor according to claim 6, wherein the flange makes contact with the coupling tube.

8. The rotor according to claim 6, wherein the flange makes contact with the supporting member.

9. A rotor comprising:

a rotor substrate comprising a first hole at one side;

a plurality of coils disposed at a surface of the rotor substrate and electrically connected to the rotor substrate;

a weight supported on the surface of the rotor at a position not interfering with the coils for making the rotor eccentric;

a supporting member configured to fix the coils and the weight and comprising a second hole coaxial with the first hole;

a bearing yoke comprising a coupling tube fixed to the second hole and a stopper rim, the stopper rim extending outward from an end portion of the coupling tube in a radial direction for making contact with the supporting member, wherein the coupling tube and the stopper rim rotate together with the plurality of coils; and a commutator disposed on the other surface of the rotor substrate around the first hole.

10. A vibration motor comprising:

a shaft;

a rotor rotatably coupled to the shaft; and a stator facing the rotor, wherein the rotor comprises:

a bearing coupled to the shaft, wherein the bearing comprises: a body; and a flange extending outward from a lower end portion of the body in a radial direction;

a bearing yoke coupled to the bearing, wherein bearing yoke comprises: a coupling tube; and a stopper rim extending outward from an upper end portion of the coupling tube in a radial direction;

a supporting member coupled to the bearing yoke;

a rotor substrate supported by the supporting member;

a coil supported by the supporting member and electrically connected to the rotor substrate; and a weight coupled to the supporting member;

wherein a lowermost surface of the coupling tube is in contact with a top surface of the flange.

11. The vibration motor according to claim 10, wherein the rotor substrate is disposed at a lower side of the supporting member, and the coil is disposed at an upper side of the rotor substrate.

12. The vibration motor according to claim 10, wherein the bearing yoke is formed of a metal.

13. The vibration motor according to claim 10, wherein the supporting member comprises a recess-shaped stopper part disposed at an upper surface of the supporting member for receiving the stopper rim.

14. The vibration motor according to claim 10, wherein flange makes contact with the supporting member.

15. A vibration motor comprising:

a case comprising an upper case and a lower case;

a shaft supported by the case;

a rotor rotatably coupled to the shaft;

a stator facing the rotor and disposed at the lower case;

a first substrate disposed at an upper surface of the lower case;

a second substrate disposed at a lower surface of the lower case; and a connection terminal disposed through the lower case for electrically connecting the first and second substrates, wherein the rotor comprises:

a bearing coupled to the shaft;

a bearing yoke conductive wires the bearing;

a supporting member coupled to the bearing yoke;

a rotor substrate supported by the supporting member;

a coil supported by the supporting member and electrically connected to the rotor substrate; and a weight coupled to the supporting member;

wherein the bearing yoke comprises:

a coupling tube; and a stopper rim extending outward from an upper end portion of the coupling tube in a radial direction, wherein at least a portion of the stopper rim is overlapped with the rotor substrate in a vertical direction.

* * * * *